United States Patent
Xiong (10) Patent No.: US 8,544,097 B2
(45) Date of Patent: Sep. 24, 2013

(54) ATTACHMENT CHAIN TRACING SCHEME FOR EMAIL VIRUS DETECTION AND CONTROL

(75) Inventor: Jintao Xiong, San Juan, PR (US)

(73) Assignee: Sistema Universitario Ana G. Mendez, Inc., San Juan, PR (US)

( * ) Notice: Subject to any disclaimer, the term of this patent is extended or adjusted under 35 U.S.C. 154(b) by 1649 days.

(21) Appl. No.: 11/549,690

(22) Filed: Oct. 16, 2006

(65) Prior Publication Data

US 2007/0136808 A1  Jun. 14, 2007

Related U.S. Application Data

(60) Provisional application No. 60/596,705, filed on Oct. 14, 2005.

(51) Int. Cl.
  *G06F 11/00* (2006.01)
  *G06F 12/14* (2006.01)
  *G06F 12/16* (2006.01)
  *G08B 23/00* (2006.01)

(52) U.S. Cl.
  USPC .......................................................... 726/24

(58) Field of Classification Search
  USPC .......................................................... 726/24
  See application file for complete search history.

(56) References Cited

U.S. PATENT DOCUMENTS

| | | | |
|---|---|---|---|
| 6,763,462 B1 | 7/2004 | Marsh | |
| 6,910,134 B1 | 6/2005 | Maher, III et al. | |
| 2002/0194490 A1* | 12/2002 | Halperin et al. | 713/200 |
| 2003/0120950 A1 | 6/2003 | Hunt | |
| 2003/0167402 A1 | 9/2003 | Stolfo et al. | |
| 2003/0188196 A1 | 10/2003 | Choi | |
| 2004/0054498 A1 | 3/2004 | Shipp | |
| 2004/0117450 A1 | 6/2004 | Campbell et al. | |
| 2004/0255159 A1 | 12/2004 | Williamson et al. | |
| 2005/0091512 A1 | 4/2005 | Shipp | |
| 2006/0117385 A1* | 6/2006 | Mester et al. | 726/22 |

OTHER PUBLICATIONS

Xiong, Jintao, ACT: Attachment Chain Tracing Scheme for Email Virus Detection and Control, WORM'04, Oct. 29, 2004, Washington DC, USA.

* cited by examiner

*Primary Examiner* — Edan Orgad
*Assistant Examiner* — Harris Wang
(74) *Attorney, Agent, or Firm* — Hoglund & Pamias, PSC; Roberto J. Rios (57) ABSTRACT

An automated email virus detection and control scheme using attachment chain tracing (ACT) technique is provided. Based on conventional epidemiology, ACT detects virus propagation by identifying the existence of transmission chains in the network. It uses contact tracing to find epidemiological links between hosts. A soft-quarantine scheme controls virus propagation by detecting and quarantining without virus signature information. A progressive immunization strategy uses transmission chain information to guide the immunization process.

43 Claims, 7 Drawing Sheets

The Transmission Chain Identification and Control System Diagram

Figure 1: Host Category Transition Diagram

Figure 2: The Transmission Chain Identification and Control System Diagram

Figure 3: An Example Network

Figure 4: The Formation of a Transmission Chain

Figure 5: Non-reinfection Virus Propagation With DQ: Random Topology

Figure 6: Non-reinfection Virus Propagation With DQ: power law topology

Figure 7: Reinfection Virus Propagation With DQ: random topology

Figure 8: Reinfection Virus Propagation with DQ: power law topology

Figure 9: Details of Virus Propagation in the Random Network

Figure 10: Details of Virus Propagation in the Power Law Network

Figure 11: Performance Comparison of SI, DQ, DQSI and DQPI: 10% Immunization, Random Network Figure 12: Performance Comparison of SI, DQ, DQSI and DQPI: 20% Immunization, Random Network Figure 13: Performance Comparison of SI, DQ, DQSI and DQPI: 20% Immunization. Power Law Network Figure 14: Performance Comparison of SI, DQ, DQSI and DQPI: 30% Immunization. Power Law Network

ATTACHMENT CHAIN TRACING SCHEME FOR EMAIL VIRUS DETECTION AND CONTROL

FIELD OF THE INVENTION

The present invention relates to the detection of viruses contained in email attachments and proper control.

BACKGROUND OF THE INVENTION

Today's society depends heavily on its information infrastructure to properly store, transmit and process vast amount of information. Computer viruses and worms pose serious threats to the normal operation of the information infrastructure by destroying stored information, disrupting information transmission and improperly collecting and handling information. These malicious activities have caught the attention of the society through a series of high-profile incidents such as the "CodeRed" worm and "Nimda" worm in 2001, the "Stammer" worm and "SoBig.F" virus in 2003 and the "Mydoom (Novarg)" worm in 2004. Worms and viruses use various ways to spread themselves. Email is increasingly becoming the most popular transmission media used by worms and viruses. In the first half of 2004, there have been several notorious email virus incidents including W32/Bagle and W32/Novarg. Several studies have shown that empirical data on "CodeRed" worm propagation fits well with simple epidemiological mathematical models. Other earlier papers have similar observations.

The similarity of growth patterns between real-world viruses and network viruses leads us to look for the existence of common ground in control strategy. Two types of techniques are used in epidemiology. One of them includes molecular epidemiological techniques such as DNA fingerprinting technique used in Tuberculosis (TB) control. DNA fingerprinting uses a DNA signature sequence, such as the insertion sequence IS6110 used by restriction fragment length polymorphism (RFLP) in TB analysis, to identify the existence of an outbreak. The other type includes classical epidemiological methods such as contact tracing. Contact tracing technique uses contact investigations to identify the transmission chain of an infectious disease. Classical epidemiological methods and molecular epidemiological methods are usually used together to detect and control the spread of infective diseases worldwide. The winning of the battles against epidemic disease spread has always been achieved by the application of multiple control methods: "Control of tuberculosis relies on well-defined tools such as case finding, contact tracing, completion of successful treatment and vaccination". Control of SARS was accomplished by "early case identification and isolation, vigorous contact tracing, voluntary home quarantine . . . ". The victory can be claimed only after the pathogen transmission chain has been broken. In network worm and virus control field, most of the techniques used to protect computers from being infected, such as patches and antivirus software, depend on the availability of virus signatures. This approach is analogous to the molecular epidemiology approach such as DNA fingerprinting. However, some effective classical epidemiological methods such as contact tracing have not found applications in network worm and virus control. The absence of key techniques like contact tracing and transmission chain identification also makes current cyber-virus defense schemes less systematic than their real world counterpart.

The early works of epidemiological modeling of worm propagation were done more than a decade ago. Several papers modeled the spread of "CodeRed" worm in recent years. Staniford-Paxson et al. used a simple epidemiological logistic equation to mode the propagation of "CodeRed". Zou-Gong et al. proposed a "two-factor" model to model the effect of human countermeasures and congestion caused by worm traffic]. Chen-Gao et al. proposed an analytical active worm propagation (AAWP) model to characterize the propagation of worms that employ random scanning. Zou-Gao et al. proposed a worm early warning system based on epidemiological models. Garetto-gong et al. used interactive Markov chains to model worm propagation.

Quarantine as a containment method has been studied in several papers. Moore-Shannon et al. studied the impacts of several design factors on the dynamics of a worm epidemic. Zou-Gong et al. proposed a dynamic quarantine method and analyzed its impact on worm propagation. It showed that dynamic quarantine can slow down worm spread. Their dynamic quarantine system quarantines a host whenever its behavior looks suspicious. The quarantine decision is made on the abnormal behavior of a host itself. To alleviate the impact of the common false alarming problem, the quarantine system will release a quarantined host after a short time so a falsely quarantined host won't be blocked for too long. Williamson proposed another behavior-based detection and control method to contain worm propagation by restricting the probing rate of infected hosts. Toth-Kruegel used the existence of similar connection pattern (destination port, content) from the connection history to detect worm propagation in an enterprise network. Wang-Knight et al. studied the effect of immunization on virus propagation. They compared the effect of random immunization and selective immunization. They showed that selectively immunizing nodes with the highest degrees has better effect than random immunization. Wang-Guo et al. proposed to use shields, vulnerability specific, exploit generic network filters to correct traffic that exploits known vulnerabilities. They demonstrated that shields can be used to prevent exploitation of a substantial fraction of the most dangerous ones. On email virus related studies, Zou-Towsley et al. studied email virus propagation on power law, small world and random graph topologies. They also studied the effect of selective immunization. Swab proposed SMTP gateway virus filtering.

SUMMARY OF THE INVENTION

Inspired by classical epidemic control strategies, it is an object of the present invention to implement a systematic approach toward email network worm and virus control.

The attachment chain tracing (ACT) scheme is based on the transmission chain concept. It brings the concepts of contact tracing and transmission chain into network security. ACT's application is limited to contained environments, such as a single enterprise, where it's possible to collect all necessary traffic information in a causal chain. It includes four components: case finding, contact tracing, quarantine, and immunization and treatment.

A behavior-based case finding scheme is adopted. A case is identified if it shows spreading behavior. The existence of a worm or virus propagation in the network is confirmed by the existence of transmission chains which are identified through contact tracing. Transmission chain information is then used to direct quarantine, immunization and treatment strategies. Although we also use behavior-based scheme to detect abnormal node behavior, we use transmission chain identification method to confirm the existence of virus spread. Based on "rational user" assumption, a "soft quarantine" strategy is proposed which uses a color code warning system to reduce the probability that a user opens a suspicious email attachment. This strategy can mitigate virus propagation without depriving users the right to make decisions on their emails. Using "soft quarantine" policy, even if there is a false quarantine decision, no damage will be done to users' emails. A progressive immunization strategy is also proposed which uses transmission chain information to choose hosts to be treated.

BRIEF DESCRIPTION OF THE DRAWINGS

Further features and advantages of the invention will become apparent from the following detailed description taken in conjunction with the accompanying figures showing illustrative embodiments of the invention, in which.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments. It is clear that changes and modifications to the described embodiments can be made without departing from the scope and spirit of the present invention as defined by the appended claims.

DETAILED DESCRIPTION OF THE DRAWINGS

In epidemic disease control, cases are classified into different categories according to their contact history and symptoms. The classification facilitates the implementation of quarantine and treatment policies. We adopt similar classification methodology here. We classify computers (hosts) into different categories according to their symptoms and contact history (links) with other hosts. For email networks, the infectious symptom is defined to be sending emails with attachments at a rate higher than a preset threshold. Since our objective is to design an automated scheme and virus signatures can not be extracted automatically, we do not use signatures in detection. An epidemiological link is established from host A to host B when an email with attachment was sent from host A to host B. A host can either have symptom or no symptom. A host may have links with either a normal host, a "confirmed" infective host (called probable case in our model), or a host in the transmission chain (possibly infective but not confirmed yet). Thus there are at most 6 categories. Since two of them are treated the same, we finally have five categories: normal, linked, suspicious, potential or probable. We give case category definitions below.

Normal case: A host which has no symptom and has no epidemiological link from other hosts is a normal case.

Suspicious case: A host which has the symptom but does not have epidemiological link from any probable host is at a suspicious case.

Linked case: A host that has an epidemiological link from a suspicious host but doesn't have the symptom itself is a linked case.

Potential case: A host which has an epidemiological link from a probable case but does not have the symptom itself is a potential case Probable case: A suspicious host which also belongs to an established transmission chain or has an epidemiological link from another probable host is a probable case.

Note probable cases have the highest probability of being an infective host. They are treated as confirmed infectives. The other cases except normal cases are possible but unconfirmed infectives. The category of a host changes when either new epidemiological links are established or when it first shows the symptom. Below are the conditions for a host to change its category.

Normal→Suspicious: a normal case becomes a suspicious case when it shows the symptom but has no epidemiological link with any probable case.

Normal→Potential: a normal case becomes a potential case when an epidemiological link from a probable case is established.

Normal→Linked: a normal case becomes a linked case when an epidemiological link from a suspicious case is established.

Suspicious→Probable: a suspicious case becomes a probable case when the transmission chain it belongs to is established or an epidemiological link from a probable case is established.

Potential→Probable: a potential case becomes a probable case when it shows infectious symptom.

Linked→Potential: a linked case becomes a potential case when an epidemiological link from a probable case is established.

Linked→Suspicious: a linked case becomes a suspicious case when it demonstrates the symptom.

Figure 1:
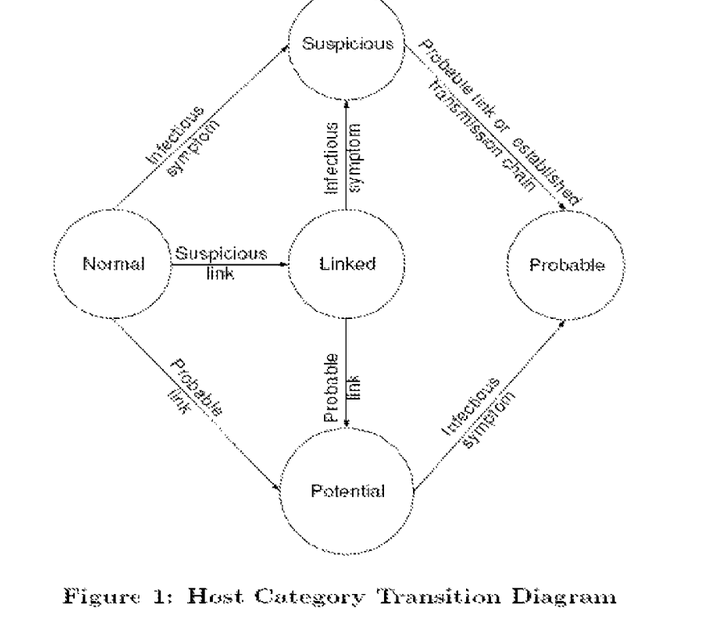
FIG. 1 shows a diagram illustrating the transition among host categories in accordance with the present invention.

FIG. 1 shows the host category transition diagram. Our case categories are similar to that of an SEI epidemic model. The normal case is equivalent to class S (susceptible). The potential case is equivalent to class E (exposed). The probable case is equivalent to class I (infective). The other two are intermediate states which will lead to other categories. Other network worm propagation models typically use SI, SIS or SIR models. We include class E in our model to differentiate links from probable cases from links from other type of cases. Remember a probable case is a confirmed infective. A computer with a probable link means that it has received a virus email from a confirmed infective. We can also say it has been exposed to the virus. It is a virus carrier until the user deletes the virus email. To better contain the virus spread, certain quarantine action should also be taken upon these virus carriers in addition to those confirmed infective hosts. But they should not be treated the same as the probable hosts. We distinguish between potential cases and probable cases so different quarantine policies can be carried out.

The Transmission Chain Identification and Control Scheme
Transmission chain is the tool used to confirm virus spread. Before we introduce the concept of transmission chain, we first define different layers of contact of a host i.

Layers of contact of host i=The hosts that have epidemiological links with host i are the primary contacts (layer 1 contacts) of i. The hosts that have epidemiological links with the primary contacts of i are the secondary contacts (layer 2 contacts) of i. The hosts that have epidemiological links with the secondary contacts of i are the tertiary contacts (layer 3 contacts) of i. Higher layer contacts are defined similarly.

It defines the email connectivity topology of host i. In an email network, the hosts that have epidemiological links with host i are the hosts whose email addresses are stored on host i. For example, the neighbors of a host are the primary contacts of the host. The definition of a transmission chain is given below.

Transmission chain=A transmission chain with length K is a series of epidemiological links that connect an index case i to a layer K contact of i.

A transmission chain starts with an index case. An index case is a case which shows infectious symptom but has no epidemiological links from any other suspicious or probable case. When an index case is identified, contact tracing is then used to monitor the development of a possible transmission chain from the index case.

The transmission chain identification algorithm

Figure 2:
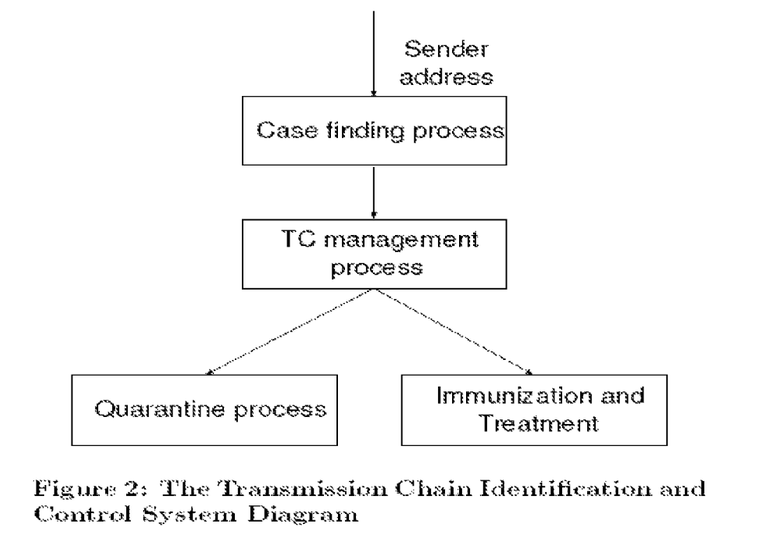
FIG. 2 shows a diagram illustrating the transmission chain identification and control system in accordance with the present invention.

The transmission chain identification and control system consists of four major processes: the case finding process (CFP), the transmission chain (TC) management process (TCMP), the quarantine process (QP) and the immunization and treatment process (ITP). The diagram of the system is shown in FIG. 2. The case finding process is responsible for detecting hosts with infectious symptom. The TC management process is responsible for setting up, updating, finishing and removing transmission chains. The quarantine process is responsible for controlling the propagation of virus. The immunization and treatment process is the vaccination and virus cleaning process. We first describe the detailed functions of CFP, TCMP and QP.

The function of the case finding process (CFP) is to detect hosts with previous defined symptom. It monitors the activities at email servers and the SMTP traffic at local gateways. If in a detection interval Id, the number of emails sent from a host is greater than a preset threshold Rd, the IP address of the host is identified. Id should not be too big in order to keep the temporal relationships between senders and receivers. Considering the time from a virus email is sent out to the time that a user reads it and opens the attachment, Id can be set to between 1 to 5 minutes. A better way maybe to choose Id according to the current email traffic. Rd is chosen to be larger than the normal average behavior which can be determined from historical data. A better way is to set different thresholds for different users. The system keeps a record for each user's normal email sending rate. A sending rate bigger than his/her normal behavior will trigger the detection mechanism. We distinguish internal email addresses and external addresses. Here "internal address" refer to email addresses within the domain of the email network and "external address" refer to email addresses outside the domain of the email network. The IP address of the sending host and the email addresses of the internal receivers of the emails are recorded and sent to the transmission chain management process (TCMP). The email addresses of the receivers will be replaced by the corresponding IP addresses when the emails are downloaded to a user computer from the server. External hosts are not categorized and external receiver addresses are not reported to TCMP. External sending host addresses are passed to TCMP since they will be index cases. Note that external receivers and internal receivers are treated differently only because it is not feasible to obtain the contact traces of external receivers. So there is no way to establish a transmission chain for external hosts. Algorithm 1 shows the pseudo code of the CFP algorithm.

---

Algorithm 1 cfp (email traffic record in $I_d$)

for all sending addresses do
    check $n_i$, the number of emails host i has sent
    if $n_i > R_d$ then
        report host i and its internal recipient addresses to TCMP
    end if
end for

---

TCMP uses the host information reported by CFP to manage transmission chains. TCMP confirms that there is virus propagation if a transmission chain with length K is formed. K is a preset parameter. TCMP uses contact tracing to update transmission chain information. It maintains a contact trace stack (CTS) for each index case. The index case is the root of a CTS. A CTS is a layered structure. Layer 0 is the index case. Layer I of the CTS stores the layer I contacts of the index case which are hosts having epidemiological links from any layer I−1 contact of the index case. Each CTS has K+1 layers which are empty initially. If the highest non-empty layer of a CTS is I, it indicates that a transmission chain with length I exists in the CTS. A tree structure would be needed to describe the detailed relationships among different contacts. But since we are only interested in the length of a transmission chain, we use a layered structure to simplify TCMP algorithms. TCMP maintains a record of all hosts that are currently in the contact tracing stacks. The location of a host i is denoted by $(S_i, L_i)$ where $S_i$ is the index of the CTS that node i is in and $L_i$ is the layer that node i is at. The main functions of TCMP include CTS setup, update and remove, host category update and transmission chain finish. We explain the details of these functions below.

The pseudo code of CTS setup is described in Algorithm 2. The index case of a transmission chain must be a case that has showed infectious symptom but has no epidemiological link from any host that has infectious symptom. So only internal normal cases and external hosts which are not the index cases of existing transmission chains are index cases of new transmission chains. If the sending host reported by CFP is such a case, TCMP will set up a new CTS for it by assigning it a new CTS index and assigning its normal receivers to layer 1 of the new CTS. In the mean time, TCMP updates the category of the index case to suspicious since it has showed infectious symptom. TCMP also updates the category of the layer 1 hosts to linked since they now have epidemiological links from a suspicious node.

---
Algorithm 2 cts_setup (node i)
--- if (i is an internal normal host) or (i is an external host but is not an index
case of any existing CTS) then
    assign i to be the index case of a new CTS $S_i$
    for all receivers of i with normal category do
        add receivers to layer 1 of CTS $S_i$
        change receivers' category to linked.
    end for
end if
if i is an internal host then
$C_i \Leftarrow$ suspicious
end if

---

If the sending host reported by CFP is not a normal case, it means this host is already in a CTS. TCMP thus performs a CTS update operation. Algorithm 3 shows the pseudo code of the CTS update algorithm. TCMP changes the category of the sending host to suspicious if it was not. It also adds new normal receivers to the next layer of the same CTS. Then, it checks the length of the transmission chain. If the sending host is at layer K of the CTS, it means that a transmission chain with length K has been formed in the CTS. TCMP then runs the transmission chain finish process (tc_finish( )) to process the newly identified transmission chain.

---
Algorithm 3 cts_update (host i)
---

$C_i \Leftarrow$ suspicious
find $(S_i, L_i)$, the location of i
for all $r_i$, new recipients of i with normal category do
    $Sr \Leftarrow Si$
    $Lr \Leftarrow Li+1$
end for
if $L_i$ = K then
    tc_finish $(S_i)$
end if

---

When a transmission chain with length K has formed, virus propagation is confirmed. The transmission chain finish process updates the categories of the hosts in the CTS where the transmission chain has finished and passes the information to the quarantine process. The category update includes changing all suspicious cases to probable category and all linked cases to potential category. All probable cases and potential cases are reported to the quarantine process. Algorithm 4 shows the pseudo code of the transmission chain finish process.

---
Algorithm 4 tc_finish (index of a CTS $S_i$)
--- for all suspicious hosts in CTS $S_i$ do
    change their category to probable
end for
for all linked hosts in CTS $S_i$ do
    change their category to potential.
end for

--- pass the address and category information of all nodes in $S_i$ to the quarantine process. remove CTS $S_i$.

To lower the probability of identifying false relationships among hosts, TCMP refreshes the CTS buffer every Tr period. A CTS is removed by TCMP under two situations. First, a CTS is removed when the transmission chain has been formed and information has been reported to the quarantine process. The other situation is when the CTS has not been updated for a period Tr. When TCMP refreshes the CTS buffer, the CTS that has not been updated for Tr period is removed and all nodes in the CTS are reset to normal category. TCMP keeps a time stamp for each CTS which records the time of the most recent update of the CTS. Tr should be much larger than the detection interval so the CTS removal operation does not interfere with the normal detection process.

Next we use an example to illustrate the above scheme for virus detection.

Figure 3:
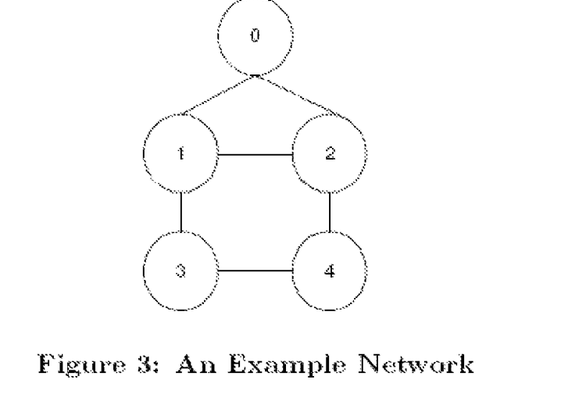
FIG. 3 illustrates an exemplary host network where the transmission chain identification and control system may be implemented in accordance with the present invention.
Figure 4:
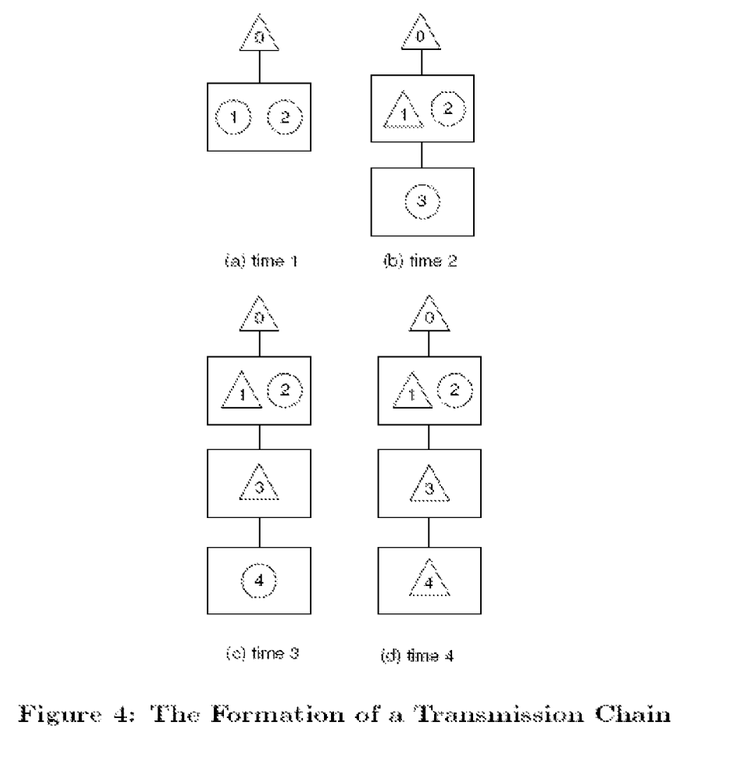
FIGS. 4a-4d show an exemplary transmission chain formation in an exemplary host network in accordance with the present invention.

FIG. 3 is an example network with 5 nodes. Assume that the above transmission chain identification scheme is implemented in the network with Rd=1, Id=1 and K=3. FIG. 4 shows the formation of the transmission chain. At time 1, node 0 sends emails to node 1 and 2 and is detected by CFP. FIG. 4(a) shows the state of the CTS when it is first established for node 0: node 0 is the index case; node 1 and 2 are at layer 1 and become linked cases. Triangle-shaped nodes denote suspicious cases. At time 2, node 1 send emails to node 0, 2, 3 and is detected. FIG. 4(b) shows the state of the CTS after node 1 has been processed by TCMP. Node 1 becomes a suspicious node. Since only node 3 is a normal node, node 3 is added to layer 2 and the category of node 3 is changed to linked. At time 3, node 3 sends emails to node 1 and 4 and is detected. FIG. 4(c) shows the state of the CTS after node 3 has been processed by TCMP. Then at time 4, node 4 sends emails to node 2 and 3 and is detected. TCMP processes node 4 and changes its category to suspicious. Since none of the recipients of node 4 belongs to normal category, no node is added to the next layer. FIG. 4(d) shows the state of the CTS. Then it sees that node 4 is at layer 3. A transmission chain with length 3 is thus identified from node 0 to node 4. TCMP changes the category of node 0, 1, 3, 4 to probable and the category of node 2 to potential. The addresses and categories of these nodes are then sent to the quarantine process.

By using transmission chain instead of isolated node behavior to detect virus propagation, the common false alarm probability of anomaly based detection algorithms can be reduced. We give a simple analysis of the probability that a transmission chain is falsely formed. Assume there is no virus spread. Hence every node detected by CFP is a false alarm. It means the false alarm probability is 100% for an anomaly detection scheme which only uses single host information. If transmission chain identification scheme is used, a false alarm will be generated only if a transmission chain is falsely identified. Let host i be the identified index case and $p_i^{false}$ be the probability that the transmission chain for host i is falsely identified. Let n be the number of nodes that are detected by CFP $p_i$ false after i has been detected. If n<K, $p_i^{false}=0$. If n≥K, an upper bound of $p_i^{false}$ can be easily derived.

$$p_i^{false} < \prod_{j=1}^{K} \frac{(n-j-1)l_i^j}{|V|}$$

Where $l^i j$ is the number of all possible layer j contacts of host i.

When updating or setting up CTS, only receivers in normal category are added to next layer of the CTS. The receivers in other categories are not added. Our rationale for this is based on several considerations. Firstly, a virus is dangerous only if it spreads to more machines over time. The detection of new hosts with infectious symptom is a sign that the virus is expanding. A virus which doesn't expand won't be identified by the transmission chain identification algorithm. Thus email broadcast discussions within users of an email list won't be identified as virus propagation. Secondly, only adding nodes in normal category to a CTS guarantees that a node will only be added to one CTS. This simplifies TCMP data structure and algorithms. Otherwise, cross infection1 and multiple infection2 will significantly increase the complexity of the data structure and transmission chain management algorithm.

It is well known that threshold based detection algorithms can be easily evaded by stealthy attacks. Obviously, the threshold based CFP process won't catch stealthy viruses. However, stealthy viruses can be caught by a non-threshold based TCMP scheme. An email server can keep traces of all attachment emails. Then every attachment email is sent to TCMP for processing without any threshold limit. Sending all attachment emails to TCMP could cause several problems. First, there could be many false alarms. Second, it could dramatically increase the load of the server. But these issues can be resolved. To reduce false alarms, we can choose large chain length K. To alleviate server load, email trace processing can be done offline during offpeak period. We can afford to do these since by nature, a stealthy virus has to spread a long time and form long transmission chains before it can cause serious damages. By running an online TCMP and an offline TCMP, both fast and stealthy viruses can be detected.

However, there are some situations that TCMP may not be helpful. For example, if the email network is densely connected, a virus may infect all the hosts before any transmission chain is formed. To solve this problem, we need dynamically adjust the length K depending on the severity of the virus spread. Also, if a virus is smart and it only sends virus emails to external addresses, then the transmission chain scheme won't catch it. But by doing this, the virus limits its spreading speed and damages itself.

The quarantine process (QP) accepts information from transmission chain management process which includes the addresses of all probable and potential cases. Its function is to mitigate virus propagation by reducing the contact between an infected host and others. The general principle of quarantine is the strictness of the quarantine policy should be proportional to the threat posed by the quarantined subject. The hosts reported to quarantine process are either in probable category or potential category. Probable hosts pose greater threat than potential hosts. Thus, we adopt a two-level quarantine scheme: a strict quarantine policy for probable cases and a less strict policy for potential cases. Different networks have different email policies: some email network operators may have the right to block a user's emails without getting the user's permission. Some may not have the right. We propose two sets of quarantine policies that the quarantine process can adopt. The first is a "hard quarantine" policy. Under the "hard quarantine" policy, QP will filter out all emails with attachments sent from a probable case and issue a warning message to a recipient when he attempts to open an attachment sent from a potential case. For email service providers who cannot block users' emails at will, we propose a "soft quarantine" policy based on the "rational user" assumption. A rational user is a user who is not willing to take risks if no benefit can be expected from taking the risk.

Under the "soft quarantine" policy, the quarantine process uses a two level color code warning system: a red warning signal for emails sent from probable cases and a yellow warning signal for emails sent from potential cases. We choose the color code warning system since similar schemes, such as the traffic light signaling and the terror threat warning schemes, have been used widely in people's daily lives. So people understand the meaning of them almost subconsciously. The color code warning system is made known to all email users. A red flag is added to every email with attachment sent from a probable host. A yellow flag is added to every email with attachment sent from a potential host. However, users make the final decision whether to open the attachment. Under "rational user" assumption, when a user receives a yellow flag, he will be less likely to open an email attachment. When he receives a red flag, the probability that he will open an attachment will be even smaller. By reducing the probability that a user opens a virus attachment, the contact rate of a virus is reduced. Soft quarantine policy has several benefits. First, many email service providers, such as Yahoo!®, already have virus warning mechanism installed which can be easily adapted to the soft quarantine policy. Secondly, since soft quarantine policy does not block any email, even if it generates a false alarm, the email detection and quarantine system won't do any real damage to users' emails. If a user suspects that one flag is a false alarm, he can always ask the sender of the email for confirmation. The email network operators don't have to worry about any legal or social issue that might arise from installing a quarantine system. Thirdly, it gives the network operator the option to switch between soft quarantine and hard quarantine depending on the load of the email network. If there is a virus but the network is operating normally, the soft quarantine policy can be adopted. However, if the network is overloaded, the hard quarantine policy can be adopted since many emails will be lost anyway.

Our email virus propagation model consists of the email virus model, the email network model, and the email user model. We describe the details of each of them below.

We define an email virus to be a malicious program that uses emails to spread itself. The virus spread may or may not require human interaction. As indicated by the definition, we use the concept email virus to cover both email viruses and email worms. It is increasingly difficult to label a malicious program a virus or a worm. For some programs, the initial infection requires human interaction. Once the initial infection is completed, they can propagate automatically. In addition to email, a virus may use other ways to spread itself. Those other transmission channels are not considered in our model. We assume the way an email virus spreads itself is by attaching itself to an email and sending it to all the email addresses it finds on a host machine. A host is infected when the user opens a virus attachment. A virus can be either a non-reinfection virus or a reinfection virus. A non-reinfection virus only spreads itself once when a user opens the virus attachment. A reinfection virus also requires a user to open a virus attachment to infect a host. But after it has infected a host, it will repeatedly send itself out according to some prearranged pattern. Most of the real world email viruses are reinfection viruses. There are various ways a virus can schedule to resend itself. For example, some virus spreads itself whenever the computer is restarted. Some virus spreads itself whenever an executable program is launched. Some virus spreads itself every time a user logs on.

Our subject is an email network which adopts the ACT scheme. We model an email network as a graph $G=(V,E)$. Each node $i \in V$ denotes a computer (host) in the network. $|V|$ is the total number of hosts in the network. A link $e=(i, j) \in E$, $i, j \in V$ denotes that node $i$'s address is stored on node $j$ and vice versa. Without loss of generality, we assume that every link is bidirectional. Also, we do not take into consideration that the topology of an email network changes over time.

The behavior of a user i is described by a quadruplet $(C_i, T_i, P_i, A_i)$. $C_i$ is user i's category as defined previously. Ai denotes the total number of email addresses stored on user i's computer. Note $A_i$ is different from the size of user i's address book and the degree $d_i$ of node i. Since many email viruses look for email addresses in other directories in addition to use a user's address book, $A_i$ is usually much larger than the size of a user's address book. $d_i$ is the number of internal addresses that are stored on node i. Apparently, $A_i \geq d_i$. $T_i$ is the time interval that user i checks his emails. We assume that when user i checks emails, he checks all new emails. If there is an attachment, he either opens it or deletes it. $P_i$ is the probability that user i opens a virus attachment. We assume each user's behavior is independent of others. It's been demonstrated that the arrival of messages to an email server can be approximated by a Poisson process. Since emails are sent during a user's email session, we approximate the email checking time interval $T_i$ of user i, i=1, 2, . . . , |V| by exponential distribution with mean $E[T_i]$. We don't know the distribution of the average email checking interval $E[T_i]$. But if we can assume that the number of users is large and $E[T_i]$s are independent and identically distributed, then we can approximate $E[T_i]$ by a Gaussian random variable with distribution N $(\mu T, \sigma^2_T)$ according to the central limit theorem. $P_i$, the probability that user i opens a virus attachment, is also approximated by a Gaussian random variable P with distribution N $(\mu P, \sigma^2_p)$ by the same argument above.

Transmission Chain Identification and Control Experiments

An email network topology is first set up. Realistic email network topologies are not available since the neighbors of a node are the internal email addresses stored under various directories on a user's machine which is usually not known even to the user himself. The size of Yahoo!® email groups has been used to argue that email networks have power law topologies. Even if the argument is valid, it may not hold when email addresses stored in other directories are included. For comparison reason, we use two topologies in the experiments, a random network topology and a power law network topology. Each topology has 5000 nodes and 15000 links. Barabasi's algorithm is used to generate the power law topology. The random topology is generated by randomly generating connections between nodes.

User i's behavior is described by a quadruplet (Ci, Ti, Pi, Ai). The total number of email addresses stored on user i's computer Ai is the sum of number of internal email addresses and number of external email addresses. The number of internal addresses is the degree $d_i$ of the node i. The number of external email addresses on user i's computer $Ei=[f_u]$ where $f_u$ is a uniform random variable on interval [0, di]. This is probably an underestimation of external email addresses stored on many computers. More external email addresses on a machine only makes it more likely to be detected by CFP. The probability $P_i$ that user i opens a virus email attachment is modeled as a Gaussian random variable P with distribution P~N(0.5, 0.04). User i's email checking interval $T_i$ has exponential distribution with mean $E[T_i]$. $E[T_i]$ has Gaussian distribution $E[T_i]$~N(20, 400). The same power law and random networks are used for all simulations.

To evaluate the performance of the quarantine process, we first model users' responses to warning signals. $P_i$ is the probability that user i opens a virus attachment when there is no warning signal. We denote $P_i^{red}$ the probability that user i will open a virus attachment after he receives a red warning signal. We denote $P_i^{yellow}$ the probability that user i will open a virus attachment after he receives a yellow warning signal. Under "rational user" assumption, we have $P_i^{red} < P_i^{yellow} < P_i$. To study the effect of user response to warning signals on the performance of the quarantine process, we categorize users into three groups: prudent category, moderate category and risky category. For prudent users, we assume $P_i^{red}=0$, $P_i^{yellow}=0.1 \cdot P_i$. Note that prudent user response models the "hard quarantine" policy which filters out all emails with attachment from probable cases. For moderate users, we assume $P_i^{red}=0.1 \cdot P_i$ and $P_i^{yellow}=0.2 \cdot P_i$. For risky users, we assume that $P_i^{red}=0.2 \cdot P_i$ and $P_i^{yellow}=0.4 \cdot P_i$. We then study the performance of the quarantine process for these three user categories. In our experiments, we assume all users in the network are in the same category.

We use discrete time simulations. To clearly observe virus propagation process, we assume that there is initially one infected node in the network and there are no external virus sources. We run each experiment 100 times and take the average as the final result. We perform the experiments for each user category, if not stated otherwise. The other parameters are: Id=1, Rd=3, K=3.

Figure 5:
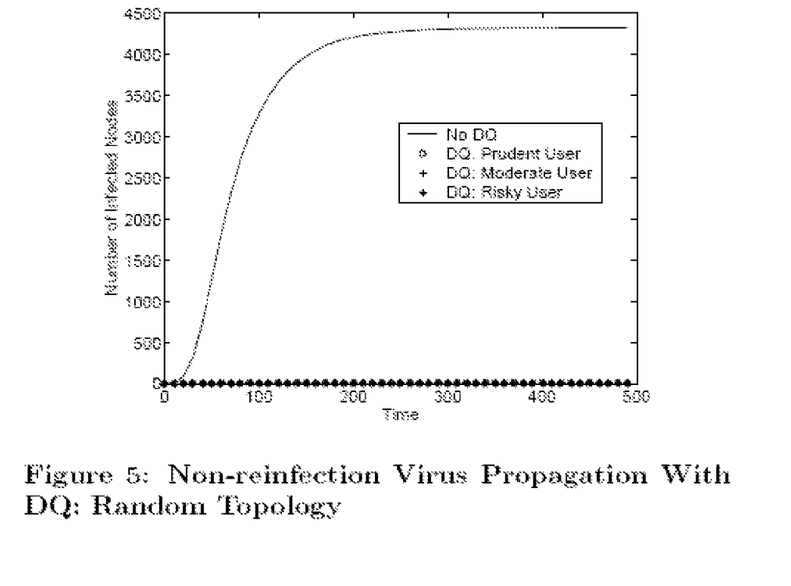
FIG. 5 shows a graph illustrating non-reinfection virus propagation with random topology in accordance with the present invention.
Figure 6:
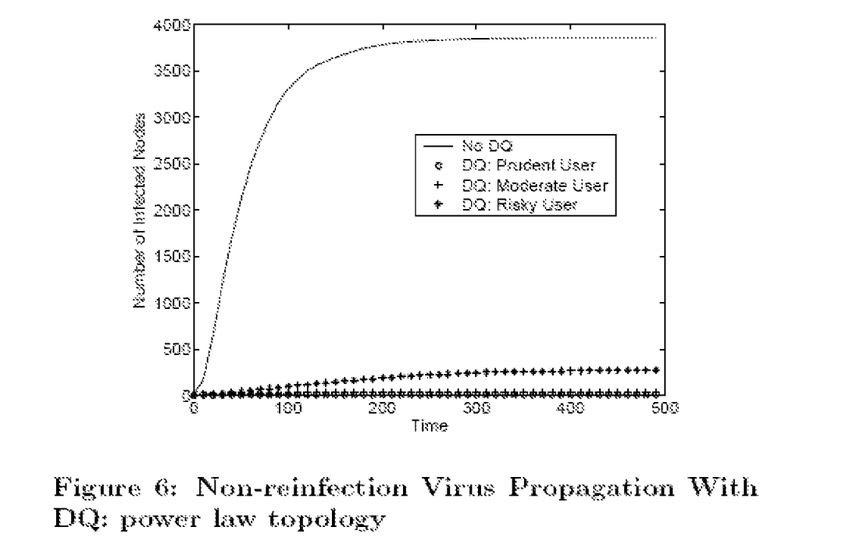
FIG. 6 shows a graph illustrating non-reinfection virus propagation with power law topology in accordance with the present invention.

FIG. 5 shows the performance of ACT for the random network topology. FIG. 6 shows the performance of ACT. In these figures, DQ denotes the detection and quarantine functions of ACT. These figures show that ACT completely stops the virus propagation. In the power law network, the virus infected a larger population than in random network before it was stopped for risky user groups. We also see that virus propagates faster in the power law network than in the random network when there is no detection and quarantine scheme.

Figure 7:
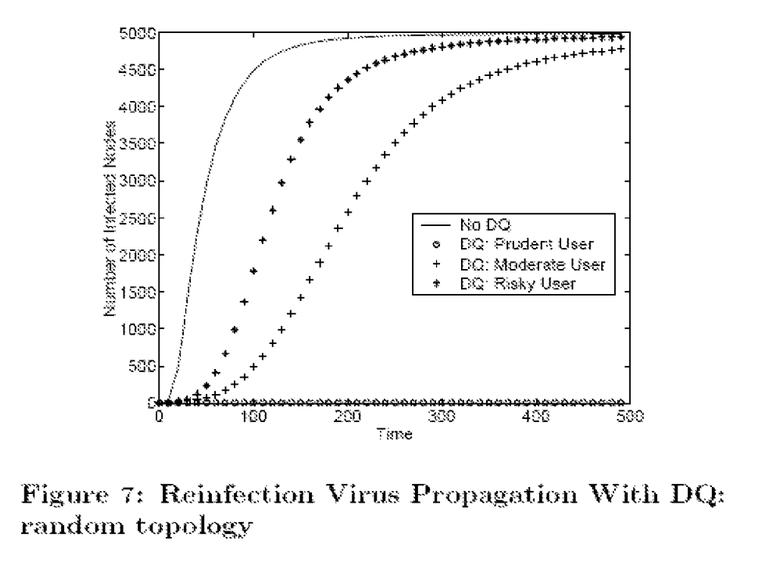
FIG. 7 shows a graph illustrating reinfection virus propagation with random topology in accordance with the present invention.
Figure 8:
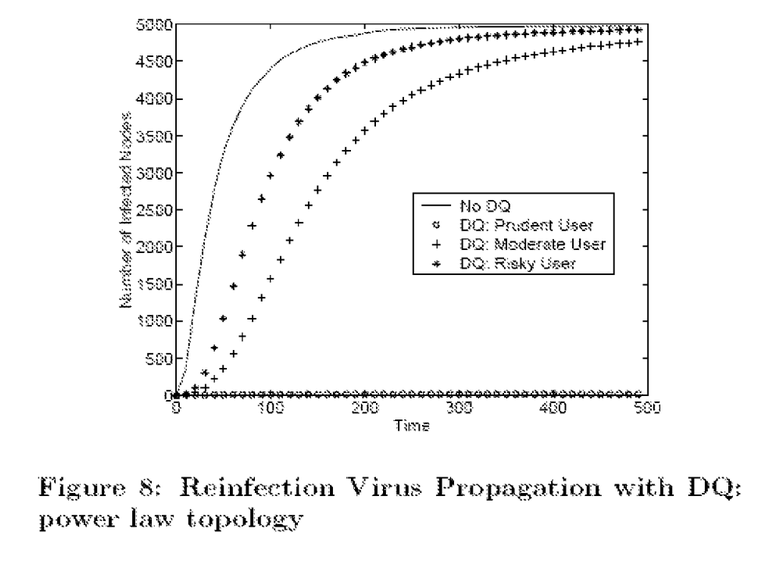
FIG. 8 shows a graph illustrating reinfection virus propagation with power law topology in accordance with the present invention.

FIG. 7 shows the performance of ACT for random network topology. FIG. 8 shows the performance of ACT for power law network topology. The setup of these experiments is the same as in the non-reinfection virus experiments. These figures show that reinfection viruses are much more difficult to contain. The propagation of the virus is slowed down significantly when applying ACT. However, virus propagation is only completely stopped when the users are prudent (or when hard quarantine is adopted). For the other two user categories, the virus eventually resumes spreading at exponential rate and infects most of the population. Similar patterns as in the non-reinfection experiments are also observed: Virus propagates slower in random networks than in power law networks. This observation is consistent with the result in Zou et al.

Next we discuss the results of the above experiments.

We use the basic reproduction number concept to explain the difference of quarantine effect on reinfection and non-reinfection viruses. The basic reproduction number, $R_0$, is defined as the average number of secondary infections produced when one infected individual is introduced into a host population where everyone is susceptible. An infection can invade and persist in a new population if and only if $R_0 > 1$. For our email network model, only the neighbors of a host are secondary infection candidates of the host. The basic reproduction number for an infected host i, $R^i_0$ of a non-reinfection virus can be calculated as:

$$R^i_0 = \sum_{k=1}^{d_i} P^i_{h_k}, k = 1, 2, \ldots, d_i$$

where $h^i_k$, k=1, 2, . . . , $d_i$ are the neighbors of host i. $P^i_{h_k}$ is decreased when a warning signal is received. Thus, $R^i_0$ is decreased by the quarantine process. As long as $P^i_{h_k}$'s are small enough, $R^i_0 < 1$ and there won't be epidemic. For a reinfection virus, the basic reproduction number takes a different form. In our model, an infected host i sends out virus emails according to a Poisson process with rate $\lambda$. Let $f_i(t)$ denote how many times host i re-sends the virus. We have $E[f_i(t)]=[\lambda t]$. The basic reproduction number is thus also a function of time t. Denote the basic reproduction number of host i with a reinfection virus $R^i_r(t)$.

$$R_r^i(t) = \sum_{k=1}^{d_i} \left(1 - (1 - P_{hk}^i)^{\lfloor \lambda t \rfloor}\right), k = 1, 2, \ldots, d_i$$

if none of the neighbors of host i has been infected by other virus sources. Obviously that $R^i_r(t)$ increases over time. If $P_{h\ k}^{i} \neq 0$, $\in T_0$, when $t>T_0$, $R^i_r>1$.

This shows that as long as users have positive probability to open a virus attachment, a reinfection virus will eventually invade the population over time. This explains why reinfection virus spread can be stopped only under prudent user assumption.

Figure 9:
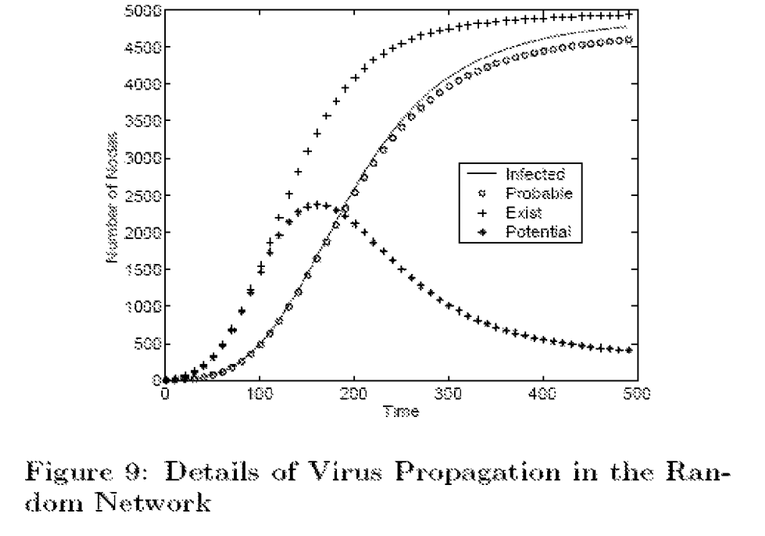
FIG. 9 shows a graph illustrating details of virus propagation in the random network in accordance with the present invention.
Figure 10:
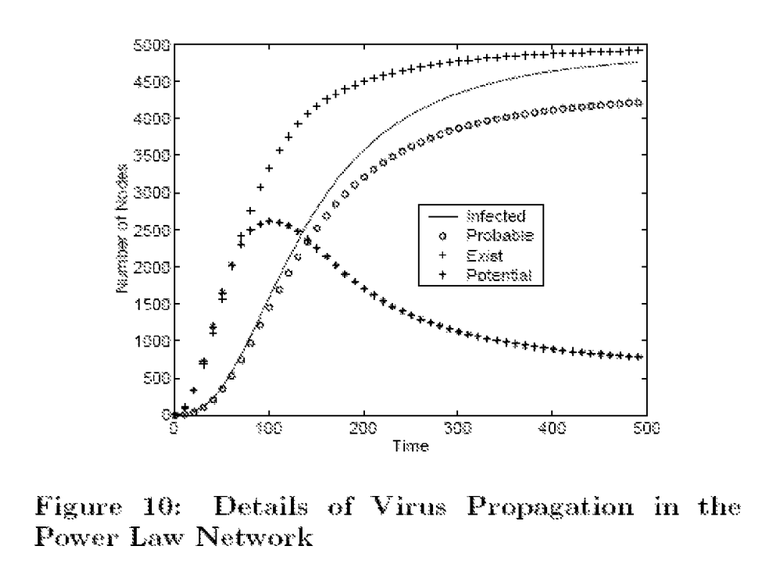
FIG. 10 shows a graph illustrating details of virus propagation in the power law network in accordance with the present invention.

We then take a closer look at the functions of ACT. Apparently, how well the potential cases and probable cases reflect the reality of virus existence and propagation in the network determines the performance of ACT. FIG. 9 gives the details of reinfection virus propagation in the random network with moderate user groups when ACT is adopted. It shows the number of probable cases, number of potential cases, number of infected nodes and number of nodes that have virus existence. FIG. 10 shows the details of reinfection virus propagation in the power law network with moderate user groups when ACT is adopted.

These two figures clearly show that the number of probable nodes is a reflection of the number of infected nodes in the network. The number of potential nodes reflects the number of nodes that have virus presence at the early stage. The number of potential nodes drops later since as time goes on, more nodes with virus existence become infected. They are then detected and become probable cases. The fact that ACT performs better in the random network is also reflected in the figures. The number of probable nodes in the power law network is not as good a reflection of the number of infected nodes as in the random network.

Experiments in previous section show that reinfection viruses are much more difficult to contain. Only hard quarantine can stop the spread of a reinfection virus. But hard quarantine may not be a realistic option for some network operators. Soft quarantine can only slow the spread of the virus but is not able to stop it. When hard quarantine is not an option, other methods must be adopted to stop virus propagation. Soft quarantine can significantly slow down the propagation of a reinfection virus and win precious time for other methods to be available. In addition to quarantine, immunization and treatment are two main methods used to combat infectious disease propagation. Within network virus control context, immunization means to patch a machine that has not been infected. Treatment means to clean an infected machine and patch it. Since the result of both operations is the same and anti-virus operations usually include both functions, we treat immunization and treatment as one method. We will use the concept "immunization" to mean both immunization and treatment. It is often the case that a patch is introduced and anti-virus software is updated only after a virus has propagated for some time. And only limited personnel is available to perform anti-virus function. Our goal is to use the limited human resource to achieve better virus control effect. We formulate the following question: If immunization tools become available after a virus has propagated for time t, and if only a % of the computers in the network can be immunized, which machines should be immunized and how should the immunization process be conducted?

A related answer is from Wang et al. (hereinafter Wang) which shows that selective immunization (SI), immunizing nodes with the highest degrees, is much more effective than random immunization. However, Wang didn't consider the factor that usually immunization method becomes available after virus has propagated for some time. Another factor is that it takes time to clean and patch a machine. So an immunization policy can not assume that immunization can be conducted to all hosts instantly. Also, for email networks, it is all but impossible to know the degree of a node (number of emails stored on the computer).

We provide a straightforward and applicable answer to this question. Our answer is the progressive immunization (PI) strategy. It makes use of the transmission chain information.

Progressive immunization strategy: If only limited immunization resources are available, immunization should be given to probable cases. And immunization should be conducted progressively as new probable cases are identified by the transmission chain identification scheme over time.

This strategy is analogous to the method used in real world: probable cases are treated by doctors while potential cases are quarantined.

Figure 11:
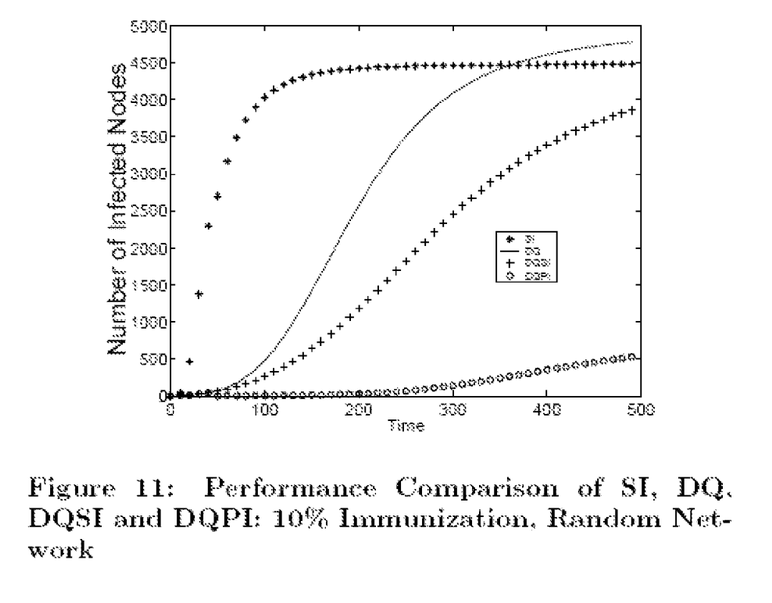
FIG. 11 shows a graph illustrating immunization performance comparison in a random network in accordance with the present invention.
Figure 12:
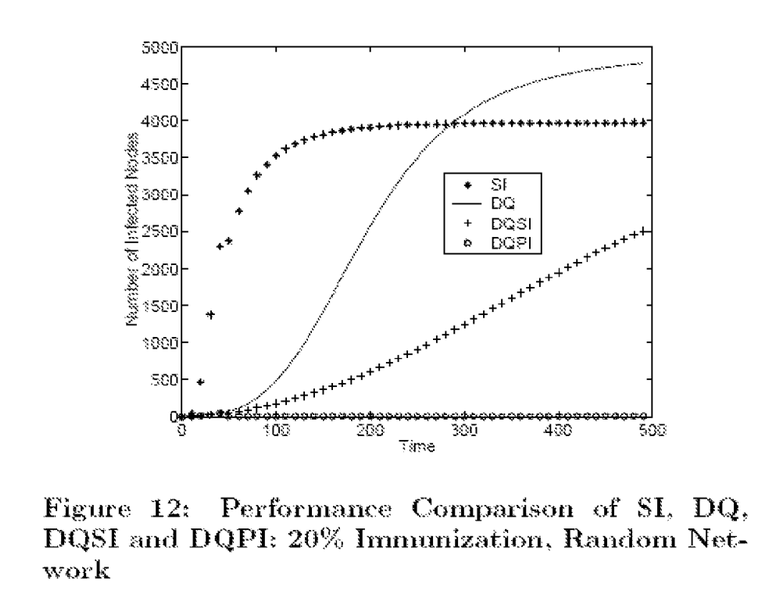
FIG. 12 shows a graph illustrating another immunization performance comparison in a random network in accordance with the present invention.
Figure 13:
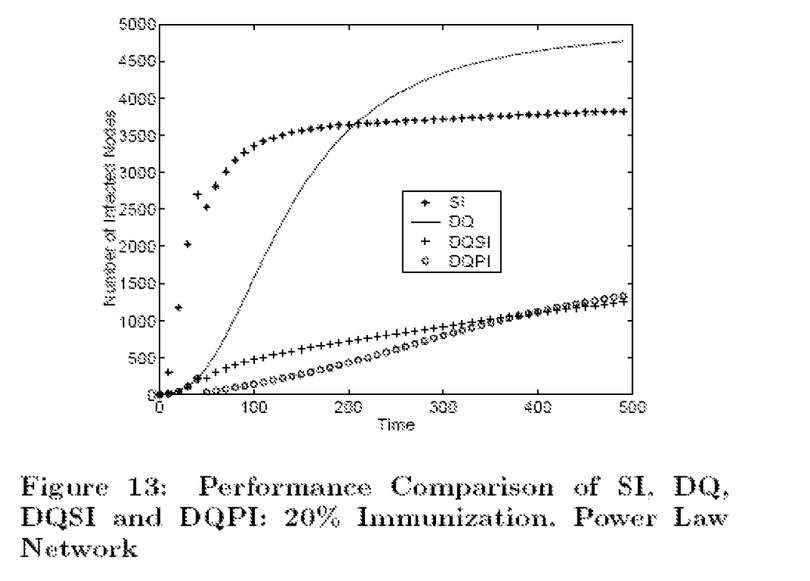
FIG. 13 shows a graph illustrating immunization performance comparison in a power law network in accordance with the present invention.
Figure 14:
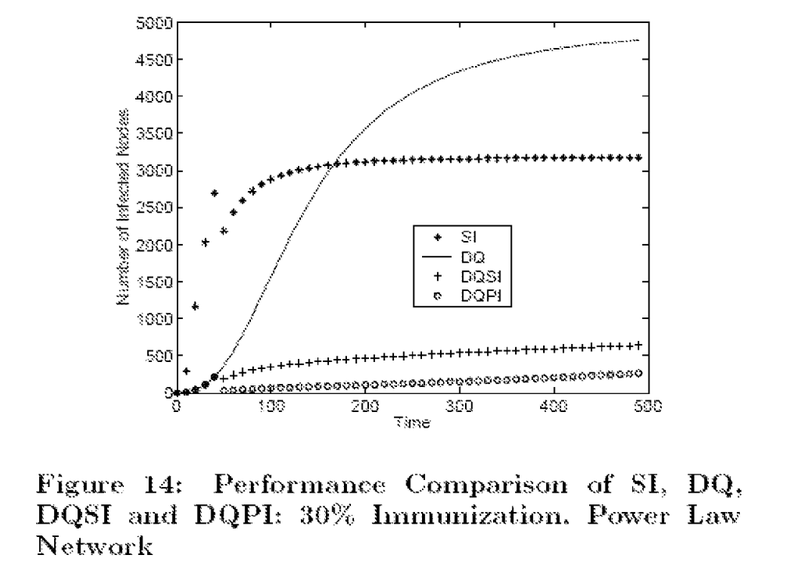
FIG. 14 shows a graph illustrating another immunization performance comparison in a power law network in accordance with the present invention.

To evaluate the effectiveness of the progressive immunization strategy, we compare it to selective immunization method using simulation experiments. In the experiments, we compare four strategies. The first is the combination of detection, quarantine and progressive immunization (DQPI). The second is the combination of detection, quarantine and selective immunization (DQSI). The third is the combination of detection and quarantine (DQ) scheme proposed previously. The last is selective immunization (SI) only. All four strategies are applied to a network at time 50. DQPI immunizes all probable nodes identified at time 50. It then immunizes new identified probable cases every 10 simulation time until a % of the population is immunized. DQSI also uses DQ scheme. The difference is at time 50, a % of the nodes with the largest $A_i$'s are immunized. SI does not use DQ. It only immunizes a % of the nodes with the largest $A_i$ at time 50. We choose several different a % and perform the experiments on both the random network and the power law network. FIG. 11 and FIG. 12 show the experiment results of random networks with 10% and 20% of the population getting the immunization respectively. FIG. 13 and FIG. 14 show the results of the power law network with 20% and 30% of the population getting the immunization respectively.

These experiments show that combining the detection and quarantine scheme with immunization always has better effect than only adopting immunization scheme or quarantine scheme.

We also see that DQPI has much better performance than SI, DQ and DQSI in the random network. In the power network, the performance difference between DQPI and DQSI is less significant although DQPI still has overall better performance. This phenomenon is consistent with the observation in Zou et al. that SI is more effective in power law networks.

To implement ACT, an ACT server should run CFP and TCMP processes. A sensor and a quarantine process should be installed on each server that handles host email requests such as SMTP servers and email gateways. For networks using SMTP services, the sensor and quarantine processes can be implemented by writing SMTP event sinks which can be programmed using Microsoft Component Object Model (COM) objects. For small systems where performance is not an issue, they can also be implemented by catching the CDO_OnArrival event using any Microsoft Collaboration Data Objects (CDO)-capable language, such as VBSCript and Visual Basic. An alternative for networks running Microsoft Exchange Server 2003 is to use Microsoft Virus scanning API (VSAPI) 2.5. Unlike previous version, VSAPI 2.5 adds SMTP sink event scanning capability which ensures scanning at servers without mailboxes such as bridgehead servers and gateway servers. Since many third party email security products are (or will be) built upon VSAPI, using VSAPI could be more efficient when integrating ACT with other email security programs.

We systematically studied email virus detection and control problem from the epidemiological viewpoint. We introduced transmission chain and contact tracing schemes and showed how they can be used in email virus detection, quarantine and immunization. We also proposed a two-level color code "soft quarantine" scheme based on "rational user" assumption to effectively quarantine virus propagation without email filtering.

What is claimed is:

1. A computer-implemented method for email virus detection comprising the steps of:
   providing an attachment chain tracing server configured to monitor a plurality of emails sent from a plurality of computer hosts connected in a network, wherein each email is associated to a computer host;
   identifying at said attachment chain tracing server at least one email with attachment sent from a computer host;
   executing at said attachment chain tracing server a case finding routine based on said identifying step to detect at least one computer host with at least one previous defined symptom;
   executing at said attachment chain tracing server a transmission chain management routine based on the outcome of said case finding routine, said transmission chain management routine:
   a) determines if a computer host that has showed a symptom has no epidemiological link from any computer host and establishes a contact trace stack beginning with an index layer assigned to said computer host that has showed a symptom but has no epidemiological link from any computer host and additional successive layers, wherein each of said additional successive layers stores contacts which are computer hosts having epidemiological links from any contact of an immediate preceding layer;
   b) determines if a computer host that has showed a symptom has an epidemiological link so that said computer host is already stored on a layer of an existing contact trace stack and adds a successive layer to said layer, wherein a length of said contact trace stack is defined by its amount of layers; and
   detecting an email virus based on said transmission chain management routine when the length of said contact trace stack reaches a preset value.

2. The method of claim 1, further comprising the steps of: performing a quarantine process; and performing an immunization and treatment process.

3. The computer-implemented method of claim 1, wherein said at least one previous defined symptom comprises the number of emails sent from said at least one computer host in a predefined time interval being greater than a preset threshold.

4. The computer-implemented method of claim 1, wherein said case finding routine is executed at said attachment chain tracing server by performing the following instructions:
   for all sending address do
   check $n_i$, wherein $n_i$ is the number of emails computer host i has sent,
   if $n_i > Rd$, wherein RD is the preset threshold, then report computer host i and its internal recipient email addresses to the transmission chain management routine
   end if
   end for.

5. The computer-implemented method of claim 3, wherein said predefined time interval is set from about 1 minute to about 5 minutes.

6. The computer-implemented method of claim 3, wherein said preset threshold is selected from at least one of: a value greater than normal average email traffic, individual user thresholds, or a combination thereof.

7. The method of claim 1, wherein said transmission chain management process comprises at least one of: creating at least one contact trace stack (CTS), updating at least one contact trace stack (CTS), removing at least one contact trace stack (CTS); updating at least one host category, refreshing at least one CTS buffer, finishing at least one transmission chain, or any combinations thereof.

8. The method of claim 7, wherein creating at least one contact trace stack (CTS) comprises identifying an index case of a transmission chain as a case that has showed infectious symptom but has no link from any host that has infectious symptom.

9. The method of claim 8, further comprising assigning the normal email receivers of said index case to a first layer of said at least one contact trace stack (CTS).

10. The method of claim 9, further comprising updating a category of said index case from normal to suspicious and a category of all the receivers in said first layer to linked.

11. The method of claim 7, wherein said creating at least one contact trace stack (CTS) is defined by the following algorithm:
   if (i is an internal normal host) or (i is an external host but is not an index case of any existing CTS) then
      assign i to be the index case of a new CTS
      for all receivers of i with normal category do
         add receivers to layer 1 of CTS
         change receivers' category to linked
      end for
   end if
   if i is an internal host then
      change index case category to suspicious
   end if.

12. The method of claim 7, wherein said updating at least one contact trace stack (CTS) comprises identifying that a received host is not a normal host and that is already in a specific CTS.

13. The method of claim 12, wherein a category of said received host is changed to suspicious.

14. The method of claim 12, further comprising adding new normal receivers to a next layer of said specific CTS.

15. The method of claim 14, further comprising comparing the number of layers of said specific CTS with a predefined length to determine that a transmission chain has been formed in said specific CTS.

16. The method of claim 7, wherein said updating at least one contact trace stack (CTS) is defined by the following algorithm: TABLE-US-00007 Change the category of the received host to suspicious, find the location of i, for all r.sub.i(new recipients of i with normal category) do add new normal receivers to next layer of CTS end for if number of layers in CTS=K (predefined number of layers) then finish the transmission chain for that CTS end if.

17. The method of claim 7, wherein said finishing at least one transmission chain comprises updating the category of the hosts in a specific CTS by changing all suspicious cases to probable category and all linked cases to potential category.

18. The method of claim 17, further comprising reporting all probable and potential cases to a quarantine process.

19. The method of claim 7, wherein said finishing at least one transmission chain is defined by the following algorithm:
for all suspicious hosts in a specific CTS do
    change their category to probable
end for
for all linked hosts in a specific CTS do
    change their category to potential
end for
pass the address and category information of all nodes in the index of the specific CTS to the quarantine process'
remove said specific CTS.

20. The method of claim 7, wherein said refreshing at least one CTS buffer comprises refreshing said buffer every predetermined amount of time.

21. The method of claim 20, further comprising the step of removing at least one CTS from the transmission chain management process.

22. The method of claim 21, wherein said removing said at least one CTS from the transmission chain management process comprises at least one of: removing said at least one CTS when a transmission chain has been formed and related information has been reported to the quarantine process, when said at least one CTS buffer has not been updated for a predetermined period of time, or a combination thereof.

23. The method of claim 2, wherein said quarantine process comprises receiving from said transmission chain management process information including at least one of: addresses of at least one probable case, addresses of at least one potential case, or a combination thereof.

24. The method of claim 2, wherein said quarantine process further comprises a two-level quarantine scheme.

25. The method of claim 24, wherein said two-level quarantine scheme comprises a first strict quarantine policy and a second less strict quarantine policy.

26. The method of claim 2, wherein said quarantine process further comprises at least one of: a hard quarantine policy, a soft quarantine policy, or a combination thereof.

27. The method of claim 26, wherein said hard quarantine policy comprises filtering out all emails with attachments sent from a probable case and issuing at least one warning indication to a recipient when said recipient attempts to open an attachment from a potential case.

28. The method of claim 26, wherein said soft quarantine policy comprises a two-level indication system.

29. The method of claim 28, wherein said two-level indication system comprises at least one of: a two-level visual system, a two-level audio system, or any combination thereof.

30. The method of claim 29, wherein said two-level visual system comprises a two-level color code warning system.

31. The method of claim 30, further comprising a first color representing emails sent from probable cases.

32. The method of claim 31, further comprising a second color representing emails sent from potential cases.

33. The method of claim 31, wherein said first color is red.

34. The method of claim 32, wherein said second color is yellow.

35. The method of claim 1, wherein said case finding process comprises at least one of: a threshold-based scheme, a non-threshold scheme, or a combination thereof.

36. The method of claim 35, wherein said threshold-based scheme further comprises dynamically adjusting a value representing a predetermined number of contact trace stack layers.

37. The method of claim 1, wherein said transmission chain management process is performed: online, off-line, or a combination thereof.

38. The method of claim 2, wherein said immunization and treatment process comprises a progressive immunization process.

39. The method of claim 38, wherein said progressive immunization process provides immunization to probable cases as new probable cases are identified by the transmission chain management process.

40. An email virus detection system comprising:
an attachment chain tracing server running a case finding routine to detect at least one previous defined symptom on a computer host that sent an email with an attachment; and a transmission chain routine based on said detection to: a) determine if a computer host that has showed a symptom has no epidemiological link from any computer host and establishes a contact trace stack beginning with an index layer assigned to said computer host that has showed a symptom but has no epidemiological link from any computer host and additional successive layers, wherein each of said additional successive layers stores contacts which are computer hosts having epidemiological links from any contact of an immediate preceding layer and b) determine if a computer host that has showed a symptom has an epidemiological link so that said computer host is already stored on a layer of an existing contact trace stack and adds a successive layer to said layer, wherein a length of said contact trace stack is defined by its amount of layers so that an email virus is detected based on said transmission chain routine when the length of said contact trace stack reaches a preset value.

41. The system of claim 40, further comprising at least one of: a sensor, a quarantine process, or a combination thereof, installed on each server that handles host email requests.

42. The system of claim 41, wherein said host email requests comprise at least one of: a SMTP service, an email gateway, or any combination thereof.

43. The system of claim 42, wherein said at least one of: a sensor, a quarantine process, or a combination thereof, is implemented by at least one of: writing SMTP event sinks, catching CDO_OnArrival events, or any combination thereof.

* * * * *